United States Patent
Yoshida et al.

(10) Patent No.: US 10,144,457 B2
(45) Date of Patent: Dec. 4, 2018

(54) VEHICLE HOOD

(71) Applicant: Kobe Steel, Ltd., Kobe-shi (JP)

(72) Inventors: Masatoshi Yoshida, Kobe (JP); Hiroko Kashima, Kobe (JP); Hideki Ishitobi, Nagoya (JP)

(73) Assignee: Kobe Steel, Ltd., Kobe-shi (JP)

( * ) Notice: Subject to any disclaimer, the term of this patent is extended or adjusted under 35 U.S.C. 154(b) by 67 days.

(21) Appl. No.: 15/450,768

(22) Filed: Mar. 6, 2017

(65) Prior Publication Data
US 2017/0282978 A1    Oct. 5, 2017

(30) Foreign Application Priority Data

Mar. 31, 2016 (JP) ................................. 2016-070579
Aug. 24, 2016 (JP) ................................. 2016-163477

(51) Int. Cl.
*B62D 25/10* (2006.01)
*B62D 27/02* (2006.01)

(52) U.S. Cl.
CPC ......... *B62D 25/105* (2013.01); *B62D 27/026* (2013.01)

(58) Field of Classification Search
CPC ...... B62D 25/10; B62D 25/105; B62D 25/12; B62D 27/026
USPC .................................................. 296/193.11
See application file for complete search history.

(56) References Cited

U.S. PATENT DOCUMENTS

| 6,883,627 | B1 |   | 4/2005  | Staines et al.                    |
|-----------|----|---|---------|-----------------------------------|
| 7,090,289 | B2 | * | 8/2006  | Koura ................ B60R 21/34 180/69.21 |
| 7,140,673 | B2 | * | 11/2006 | Ito ..................... B60R 21/34 296/193.11 |
| 2004/0021342 | A1 |   | 2/2004  | Fujimoto                       |
| 2008/0007094 | A1 |   | 1/2008  | Ishitobi                       |
| 2014/0015285 | A1 | * | 1/2014  | Ishitobi ............ B62D 25/105 296/193.11 |
| 2015/0353141 | A1 | * | 12/2015 | Yoshida ............ B62D 25/105 296/193.11 |

FOREIGN PATENT DOCUMENTS

| JP | 2001-151159 A | 6/2001 |
| JP | 2003-205886 A | 7/2003 |
| JP | 2008-30574 A  | 2/2008 |
| JP | 2012-214076 A | 11/2012 |

* cited by examiner

*Primary Examiner* — Jason S Daniels
(74) *Attorney, Agent, or Firm* — Oblon, McClelland, Maier & Neustadt, L.L.P.

(57) ABSTRACT

Provided is a vehicle hood that allows a reduction in thickness of an outer panel while providing stiffness of the outer panel. A vehicle hood includes an outer panel, an inner panel, and a plurality of adhesive components. The inner panel has a plurality of beads. Each bead has a support part that supports each adhesive component. The adhesive components are provided on the support parts so as to be intermittently aligned along a specific direction. A support-part interval between the support parts adjacent to each other in an intersecting direction is smaller than an adhesive-component interval between the adhesive components adjacent to each other on the support parts.

6 Claims, 4 Drawing Sheets

| case | THICKNESS t1 (mm) | INDEX VALUE D/t1 | CURVATURE RADIUS R(mm) | STIFFNESS VALUE P/S(N/mm) |
|---|---|---|---|---|
| 1 | 1.0 | 100.0 | 3000.0 | 85.3 |
| 2 | 0.7 | 142.9 | 3000.0 | 48.7 |
| 3 | 1.2 | 83.3 | 3000.0 | 139.5 |
| 4 | 1.0 | 150.0 | 3000.0 | 40.6 |
| 5 | 1.0 | 200.0 | 3000.0 | 20.6 |
| 6 | 0.7 | 214.3 | 3000.0 | 27.8 |
| 7 | 1.2 | 166.7 | 3000.0 | 31.8 |
| 8 | 1.0 | 100.0 | 3000.0 | 82.0 |
| 9 | 1.0 | 100.0 | 3000.0 | 84.8 |
| 10 | 0.7 | 285.7 | 3000.0 | 13.8 |
| 11 | 1.2 | 125.0 | 3000.0 | 62.0 |
| 12 | 1.0 | 50.0 | 3000.0 | 320.9 |
| 13 | 0.7 | 71.4 | 3000.0 | 128.2 |
| 14 | 1.0 | 50.0 | 3000.0 | 310.9 |
| 15 | 1.0 | 150.0 | 3000.0 | 39.7 |
| 16 | 0.7 | 142.9 | 3000.0 | 45.2 |
| 17 | 1.2 | 83.3 | 3000.0 | 138.1 |
| 18 | 1.0 | 100.0 | 8000.0 | 93.5 |
| 19 | 1.0 | 150.0 | 8000.0 | 49.2 |
| 20 | 1.0 | 200.0 | 8000.0 | 29.8 |

VEHICLE HOOD

The present invention relates to a vehicle hood having an inner panel and an outer panel.

A vehicle hood having an outer panel and an inner panel has been known. Such a vehicle hood often has a plurality of beads on the inner panel to provide pedestrian protection performance. For example, Japanese Unexamined Patent Application Publication No. 2012-214076 (JP-A-2012-214076) discloses a vehicle hood having an outer panel, an inner panel having a plurality of beads, and connection components connecting the outer panel to the inner panel. The beads each have a shape extending substantially straightly along a vehicle width direction, and are disposed so as to be separated from one another in a front-back direction of the vehicle. Each bead has an inclined surface rising from the bottom of the inner panel, and a joint surface connected to the upper end of the inclined surface. The joint surface is opposed to the outer panel, and the adhesive components are intermittently disposed along the joint surface.

Such a vehicle hood, i.e., a vehicle hood including an inner panel having a plurality of beads is improved in bending stiffness. In addition, when a head of a pedestrian collides with the hood, impact load is dispersedly applied to the hood along the beads. This suppresses local deformation of the hood during the collision, and increases an acceleration primary peak at an initial stage of collision, leading to a decrease in head injury criterion (HIC) score.

SUMMARY

Although the vehicle hood requires weight reduction of the outer panel, the vehicle hood described in JP-A-2012-214076 is limited in weight reduction of the outer panel. Specifically, the outer panel is probably reduced in thickness to reduce weight of the outer panel. In such a case, however, stiffness (tension stiffness or dent resistance) required for the outer panel is difficult to be provided. That is, such a vehicle hood is less likely to be reduced in thickness of the outer panel while providing the stiffness.

An object of the invention is to provide a vehicle hood that allows a reduction in thickness of the outer panel while providing stiffness of the outer panel.

The inventors have made earnest investigations to solve the above-described problem, and consequently have found that an adhesive component provided on each portion, which is opposed to the outer panel, of each bead of the inner panel has a function of supporting the outer panel from below, and such support contributes to improvement in stiffness of the outer panel. A relatively large space exists between a portion, which is located over an area between the beads adjacent to each other, of the outer panel and a bottom of the inner panel. Hence, stiffness of such a portion is lower than stiffness of a portion, which is supported by the adhesive component, of the outer panel. However, the inventors have had an idea that stiffness of the portion located over the area between the beads can be effectively provided by narrowing a gap between the adhesive components that are adjacent in an alignment direction of the beads, i.e., narrowing a gap between beads adjacent to each other, which allows the thickness of the outer panel to be reduced.

The invention, which has been made based on such a viewpoint, provides a vehicle hood that includes an outer panel, an inner panel disposed below the outer panel, and a plurality of adhesive components connecting the outer panel to the inner panel, in which the inner panel has a plurality of beads, which each have a shape extending along a specific direction and are disposed so as to be intermittently aligned along an intersecting direction intersecting with the specific direction, each of the beads has a support part that has a shape extending along the specific direction and supports each of the adhesive components at a position opposed to the outer panel, the adhesive components are provided on the support parts so as to be intermittently aligned along the specific direction, and a support-part interval between the support parts adjacent in the intersecting direction is smaller than an adhesive-component interval between the adhesive components adjacent to each other on each of the support parts.

In the vehicle hood, the support-part interval is smaller than the adhesive-component interval, which effectively provides stiffness of the portion, which is located on each support part of the outer panel and stiffness of the portion, which is located over the area between the support parts adjacent to each other, of the outer panel. Consequently, the outer panel can be reduced in thickness.

In such a case, adhesive components disposed on specific support parts among the support parts and adhesive components disposed on support parts adjacent to the specific support parts in the intersecting direction are preferred to be disposed in a zigzag pattern.

This effectively provides stiffness of the portion, which is located over the area between the support parts adjacent to each other, of the outer panel.

In the vehicle hood, the outer panel is made of aluminum or aluminum alloy, the outer panel has a middle adhesive region between a portion located on the foremost bead located in the forefront among the beads and a portion located on a rearmost bead located most rearward among the beads in a vehicle front-back direction, and an index value, which is represented by a ratio of the adhesive-component interval to a thickness of the outer panel in the middle adhesive region, is preferred to be 175 to 235.

This makes it possible to effectively provide the stiffness required for the middle adhesive region of the outer panel while avoiding a significant increase in cost. Specifically, the index value of 175 or more suppresses an increase in adhesion cost (caused by an increase in tact time) due to an excessive decrease in adhesive-component interval in the middle adhesive region (due to an excessive increase in amount of adhesive component), or suppresses an increase in cost of the outer panel due to an excessive increase in thickness of the outer panel. The index value of 235 or less allows the adhesive-component interval in the middle adhesive region, or an interval between support points supporting the middle adhesive region, to have a value appropriate for the thickness of the outer panel, which effectively provides the stiffness of the middle adhesive region.

Since the stiffness value of the outer panel (a value obtained by dividing a load by outer-panel displacement occurring when the load is applied to the outer panel) is 18 to 30 N/mm, the stiffness required for the outer panel is more securely provided. The tension stiffness value is equivalent to that of an outer panel of an existing steel vehicle hood, and thus sufficiently meets the vehicle performance. Furthermore, the adhesive-component interval is set to an appropriate value, which makes it possible to decrease the thickness of the outer panel of the vehicle hood made of aluminum or aluminum alloy to less than 0.9 mm as the previous minimum value.

In such a case, the inner panel further has a front support part that supports the adhesive components at a position opposed to the outer panel between the foremost bead and a front end of the inner panel, the outer panel has a front adhesive region between the portion located on the foremost bead and the front end of the outer panel in the vehicle front-back direction, and an index value, which is represented by a ratio of a front adhesive-component interval between the adhesive components in a vehicle width direction in the front adhesive region to the thickness of the outer panel, is preferred to be 80 to 100.

This effectively provides strength (dent resistance) in the front adhesive region of the outer panel while avoiding a significant increase in cost. Specifically, the index value of 80 or more suppresses an increase in adhesion cost (caused by an increase in tact time) due to an excessive decrease in interval between the adhesive components (an excessive increase in amount of adhesive component) in the front adhesive region, or suppresses an increase in cost of the outer panel due to an excessive increase in thickness of the outer panel to provide strength (dent resistance) of the front adhesive region. The index value of 100 or less allows an interval between the adhesive components in the front adhesive region, or an interval between support points supporting the front adhesive region, to have a value appropriate for the thickness of the outer panel, which effectively provides the strength of the front adhesive region.

In the vehicle hood, an edge of the outer panel configures a folded grip part that grips an edge of the inner panel, from both sides in the thickness direction of the inner panel while being folded inward, and the thickness of the inner panel is preferred to be at least 0.8 times the thickness of the outer panel.

This suppresses breakage of the folded grip part of the outer panel. Specifically, the thickness of the inner panel is preferred to be at least 0.8 times the thickness of the outer panel, which suppresses excessive deformation of the edge of the outer panel during bending in which the edge of the outer panel is folded inward so as to grip the edge of the inner panel, and thus suppresses breakage of the folded grip part.

In such a case, the thickness of the inner panel is preferred to be not more than 1.1 times the thickness of the outer panel.

This avoids an increase in weight of the inner panel and avoids the resulting increase in cost.

In this way, the invention can provide a vehicle hood that allows a reduction in thickness of the outer panel while providing stiffness of the outer panel.

DETAILED DESCRIPTION

Figure 1:
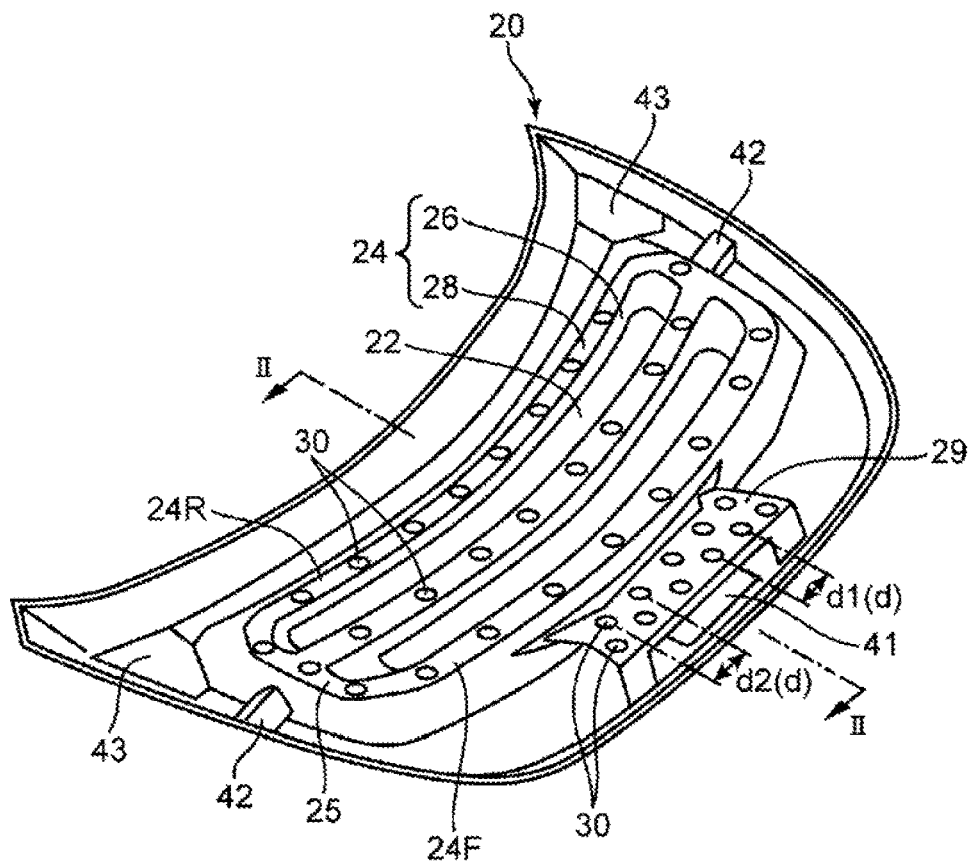
FIG. 1 is a schematic view of an inner panel of a vehicle hood of one embodiment of the invention.
Figure 2:
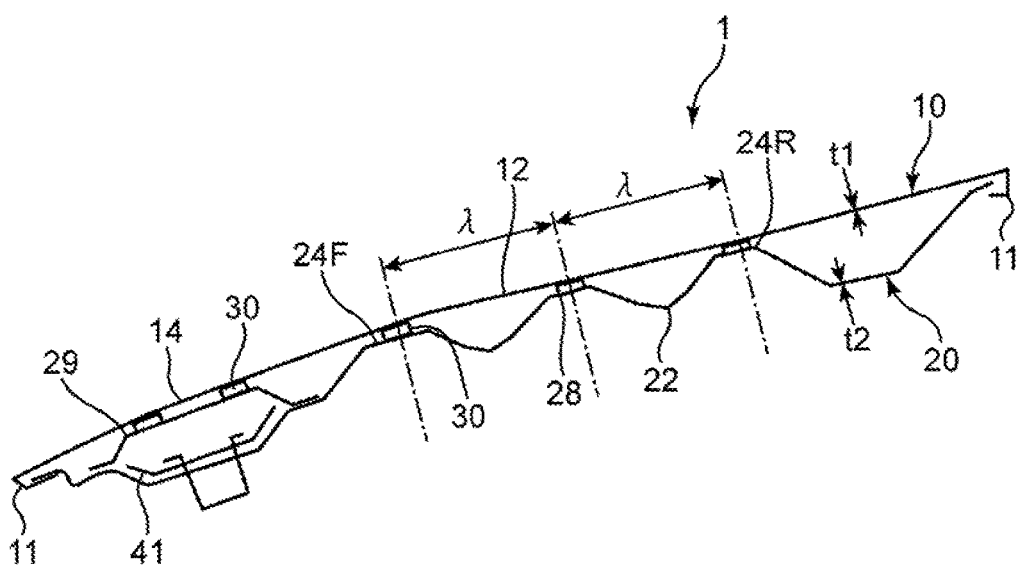
FIG. 2 is a sectional view along a line II-II in FIG. 1.
Figure 3:
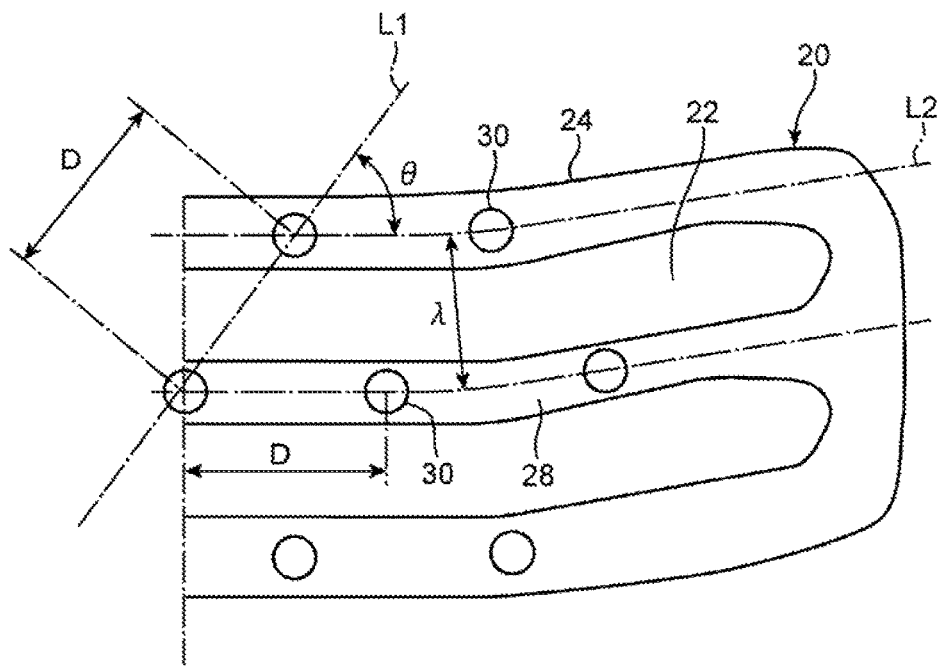
FIG. 3 illustrates a relationship between a support part of a bead and an adhesive component.

A vehicle hood 1 of one embodiment of the invention is now described with reference to FIGS. 1 to 3.

The vehicle hood 1 includes an outer panel 10, an inner panel 20 disposed below the outer panel 10, and a plurality of adhesive components 30 that connect the outer panel 10 to the inner panel 20. In FIG. 1, illustration of the outer panel 10 is omitted. Each of the outer panel 10 and the inner panel 20 has a symmetric shape in a vehicle width direction with reference to a plane that passes through the lateral middle and is orthogonal to the vehicle width direction.

The outer panel 10 is made of aluminum or aluminum alloy. The outer panel 10 is preferred to include 6000-series aluminum alloy in light of dent resistance. As illustrated in FIG. 2, each edge of the outer panel 10 configures a folded grip part 11 that grips an edge of the inner panel 20 from the two sides in a thickness direction of the inner panel 20 while being folded inward (toward the inner panel 20). The folded grip part 11 is formed through a process in which the edge of the outer panel 10 is folded inward (hemming).

The inner panel 20 is made of aluminum or aluminum alloy. The inner panel 20 includes a bottom 22 and a plurality of (three in this embodiment) beads 24. The bottom 22 and the beads 24 are each formed through press forming of a sheet material including aluminum or aluminum alloy. A ratio t2/t1 of the thickness t2 of the inner panel 20 to the thickness t1 of the outer panel 10 is desirably set to 0.8 to about 1.1. In this embodiment, the bottom 22 and the beads 24 each have a shape extending along the vehicle width direction.

The bottom 22 is shaped to be convex downward (toward a built-in component such as an engine). The lower end of the bottom 22 preferably has a shape bent to be downward convex. Pedestrian protection performance of the vehicle hood is evaluated by a head injury criteria (HIC score) calculated from an acceleration applied to a head impactor simulating a pedestrian head when the impactor is collided with an arbitrary portion of the hood at a predetermined speed and a predetermined angle. The HIC score is lower, the pedestrian protection performance is better. The HIC score tends to be lower as an acceleration (acceleration secondary peak) is lower when a hood inner collides with a built-in component such as an engine below the hood in the latter half of collision. In this structure, the lower end of the bottom 22 is bent to be downward convex, which prompts crush of the bottom 22 at collision with the built-in component. Specifically, the bottom 22 is easily crushed and thus the acceleration secondary peak is reduced, thereby the HIC value is effectively decreased.

Each bead 24 has an inclined wall 26 that rises from the bottom 22 toward the outer panel 10, and a support part 28 connected to an upper end of the inclined wall 26.

The inclined wall 26 has an inclined shape so as to approach the outer panel 10 as being farther from the longitudinal middle of the bottom 22 in a vehicle front-back direction.

The support part 28 supports the adhesive component 30 at a position opposed (and close) to the outer panel 10. The support part 28 is formed substantially flat. The support part 28 has a shape extending along the vehicle width direction.

In this embodiment, the inner panel 20 further has a front support part 29 that supports the adhesive component 30 at a position opposed to the outer panel 10 between a foremost bead 24F located at the foremost among the beads 24 and the front end of the inner panel 20. The length of the front support part 29 is about 200 nm in the front-back direction, and about 400 nm in the vehicle width direction. In this embodiment, the front support part 29 is formed of a component, which is different from a component including the bottom 22 and the beads 24, of the inner panel 20.

However, the front support part 29 may be integrally formed of the component including the bottom 22 and the beads 24.

The inner panel 20 further has a striker reinforcement component 41, crush beads 42, and hinge reinforcement components 43. The striker reinforcement component 41 is disposed on a portion located below the front support part 23 in the inner panel 20. Each crush bead 42 is provided between a connection bead 25, which connects the ends in the vehicle width direction of the beads 24 to one another, and a lateral end of the inner panel 20. Each hinge reinforcement component 43 is provided on the inner panel 20 at a rear corner of the inner panel 20.

The adhesive components 30 are provided on each support part 28 and on the front support part 29. The adhesive components 30 bond the inner panel 20 to the outer panel 10. Each adhesive component 30 has a function of supporting the outer panel from below. Such support contributes to improvement in stiffness of the outer panel 10. In this embodiment, a mastic adhesive is used as the adhesive component 30. Arrangement of the adhesive components 30 provided on each support part 28 and arrangement of the adhesive components 30 provided on the front support part 29 are now described in this order.

The adhesive components 30 are intermittently provided on each support part 28 along a longer direction of the support part 28. An interval $\lambda$ between straight lines each passing through the middle of each of the support parts 28 adjacent to each other in the vehicle front-back direction (hereinafter, referred to as "support-part interval $\lambda$") is set to be smaller than an interval D between the adhesive components 30 adjacent to each other on the support parts 28 (hereinafter, referred to as "adhesive-component interval D"). As illustrated in FIG. 3, the adhesive components 30 disposed on a particular support part 28 and the adhesive components 30 disposed on a support part 28 adjacent to the particular support part 28 are disposed in a zigzag pattern (alternately so as not to overlap with each other in the vehicle front-back direction). In this embodiment, an angle $\theta$ defined by a straight line L1, which connects one adhesive component 30 disposed on a particular support part 28 to an adhesive component 30 disposed at a position closest to the one adhesive component 30 among the adhesive components 30 disposed on a support part 28 adjacent to the particular support part 28, and a straight line L2 passing through the middle of the particular support part 28 in the vehicle front-back direction is set to substantially 60°. That is, two adhesive components 30 adjacent to each other on the particular support part 28 and the one adhesive component 30 disposed at the position closet to both the two adhesive components 30 on the support part 28 adjacent to the particular support part 28 are disposed at positions corresponding to vertices of a substantially equilateral triangle. This equalizes intervals of the outer panel 10 supported by the adhesive components 30; hence, tension stiffness of the outer panel 10 can be efficiently provided without increasing the number of adhesive components 30.

Arrangement of the adhesive components 30 provided on the front support part 29 are now described. The adhesive components 30 provided on the front support part 29 include a front-row adhesive component group and a back-row adhesive component group. The front-row adhesive component group includes a plurality of adhesive components 30 that are disposed on a front side in the vehicle front-back direction and intermittently aligned along the vehicle width direction. The back-row adhesive component group includes a plurality of adhesive components 30 that are disposed behind the front-row adhesive component group in the vehicle front-back direction and intermittently aligned along the vehicle width direction. As illustrated in FIG. 1, the adhesive components 30 included in the front-row adhesive component group and the adhesive components 30 included in the back-row adhesive component group are disposed in a zigzag pattern. In this embodiment, an interval d1 between the adhesive components 30 in the front-row adhesive component group is set to substantially the same as an interval d2 between the adhesive components 30 in the back-row adhesive component group. Hereinafter, the interval d1 and the interval d2 are each represented as front adhesive-component interval d. The front adhesive-component interval d is smaller than the adhesive-component interval D between the adhesive components 30 provided on the support part 28.

The outer panel 10 is supported by the inner panel 20 with the adhesive components 30 disposed on each support part 28 and the adhesive components 30 disposed on the front support part 29. That is, the outer panel 10 includes a middle adhesion region 12 as a region adhered to the adhesive components 30 disposed on each support part 28, and a front adhesion region 14 as a region adhered to the adhesive components 30 disposed on the front support part 29. Specifically, the middle adhesion region 12 refers to a region of the outer panel 10 between a portion located on the foremost bead 24F in the vehicle front-back direction and a portion located on the rearmost bead 24R located at the rearmost position among the beads 24. The front adhesion region 14 refers to a region of the outer panel 10 between a portion located on the foremost bead 24F and the front end of the outer panel 10. An index value D/t1, which is represented by a ratio of the adhesive-component interval D to the thickness t1 of the outer panel 10 in the middle adhesion region 12, is set to 175 to 235. An index value d/t1, which is represented by a ratio of the front adhesive-component interval d to the thickness t1 of the outer panel 10 in the front adhesion region 14, is set to 80 to 100. A ratio $\lambda$/t1 of the support-part interval $\lambda$ to the thickness t1 of the outer panel 10 in the middle adhesion region 12 is set to 100 to 135.

As described above, the vehicle hood 1 of this embodiment is designed such that the support-part interval $\lambda$ is set to be smaller than the adhesive-component interval D in the middle adhesion region 12. Each adhesive component 30 has a function of supporting the outer panel 10 from below, and such support contributes to improvement in stiffness of the outer panel 10. The support-part interval $\lambda$ is thus smaller than the adhesive component interval D. This effectively provides stiffness of a portion, which is located on each support part 28, of the outer panel 10, and provides stiffness of a portion, which is located over an area between the support parts 28 adjacent to each other, of the outer panel 10. Consequently, the outer panel 10 can be reduced in thickness.

The adhesive components 30 on the support parts 28 are set to be located at positions corresponding to vertices of a substantially equilateral triangle. This effectively provides stiffness of the outer panel 10 with a smaller number of adhesive components 30.

Furthermore, the index value D/t1, which is represented by the ratio of the adhesive-component interval D to the thickness t1 of the outer panel 10 in the middle adhesion region 12, is set to 175 to 235. It is therefore possible to effectively provide the stiffness required for the middle adhesion region 12 of the outer panel 10 while avoiding a significant increase in cost. Specifically, the index value D/t1 of 1.75 or more suppresses an increase in adhesion cost (caused by an increase in tact time) due to an excessive decrease in adhesive-component interval D (an excessive increase in amount of the adhesive component 30) in the middle adhesive region 12, or suppresses an increase in cost of the outer panel 10 due to an excessive increase in thickness t1 of the outer panel 10. The index value D/t1 of 235 or less allows the adhesive-component interval D in the middle adhesive region 12, or an interval between support points supporting the middle adhesive region 12, to have a value appropriate for the thickness of the outer panel 10, which effectively provides the stiffness of the middle adhesive region 12.

Since the stiffness value of the outer panel 10 (a value obtained by dividing a load by outer-panel displacement occurring when the load is applied to the outer panel 10) is 18 to 30 N/mm, the stiffness required for the outer panel 10 is securely provided. The tension stiffness is equivalent to that of an outer panel of an existing steel vehicle hood, and thus sufficiently meets the vehicle performance. Furthermore, the adhesive-component interval D is set to an appropriate value, which makes it possible to decrease the thickness of the outer panel of the vehicle hood made of aluminum or aluminum alloy to less than 0.9 mm as the previous minimum value.

In addition, the index value d/t1, which is represented by the ratio of the front adhesive-component interval d to the thickness t1 of the outer panel 10 in the front adhesion region 14, is set to 80 to 100. This effectively provides strength (dent resistance) in the front adhesive region 14 of the outer panel 10 while avoiding a significant increase in cost. Specifically, the index value d/t1 of 80 or more suppresses an increase in adhesion cost (caused by an increase in tact time) due to an excessive decrease in adhesive-component interval d (an excessive increase in amount of adhesive component 30) in the front adhesive region 14, or eliminates the need of increasing the thickness t1 of the outer panel 10 to provide strength of the front adhesive region 14 and thus suppresses an increase in cost of the outer panel 10. The index value d/t1 of 100 or less allows the front adhesive-component interval d in the front adhesive region 14, or an interval between support points supporting the front adhesive region 14, to have a value appropriate for the thickness of the outer panel, which effectively provides the strength of the front adhesive region 14.

Furthermore, the thickness t2 of the inner panel 20 is at least 0.8 times the thickness t1 of the outer panel 10, which suppresses breakage of the folded grip part 11 of the outer panel 10. Specifically, the thickness t2 of the inner panel 20 is at least 0.8 times the thickness t1 of the outer panel 10, which suppresses excessive deformation of the edge of the outer panel 10 during bending in which the edge of the outer panel 10 is folded inward so as to grip the edge of the inner panel 20, and thus suppresses breakage of the folded grip part 11.

In addition, the thickness t2 of the inner panel 20 is not more than 1.1 times the thickness t1 of the outer panel 10, which avoids an increase in weight of the inner panel 20 and avoids the resulting increase in cost.

The embodiment disclosed herein should be considered to be exemplarily, but not limitedly, shown in all respects. The scope of the invention is defined by claims rather than the description of the embodiment, and includes all modifications and alterations in the sense equivalent to or within the scope of claims.

For example, the beads 24 may be shaped not extending along the vehicle width direction, but may be shaped extending along the vehicle front-back direction or a direction intersecting with both the vehicle width direction and the front-back direction.

EXAMPLE

An example (an evaluation test of tension stiffness of the outer panel 10) of the above-described embodiment is now described with reference to FIGS. 4 to 8.

Figure 4:
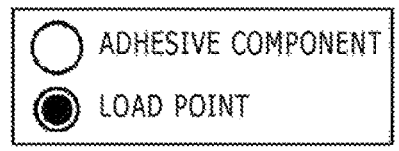
FIG. 4 is a plan view illustrating exemplary arrangement of spring components simulating the adhesive components with respect to a test panel simulating an outer panel.
Figure 4:
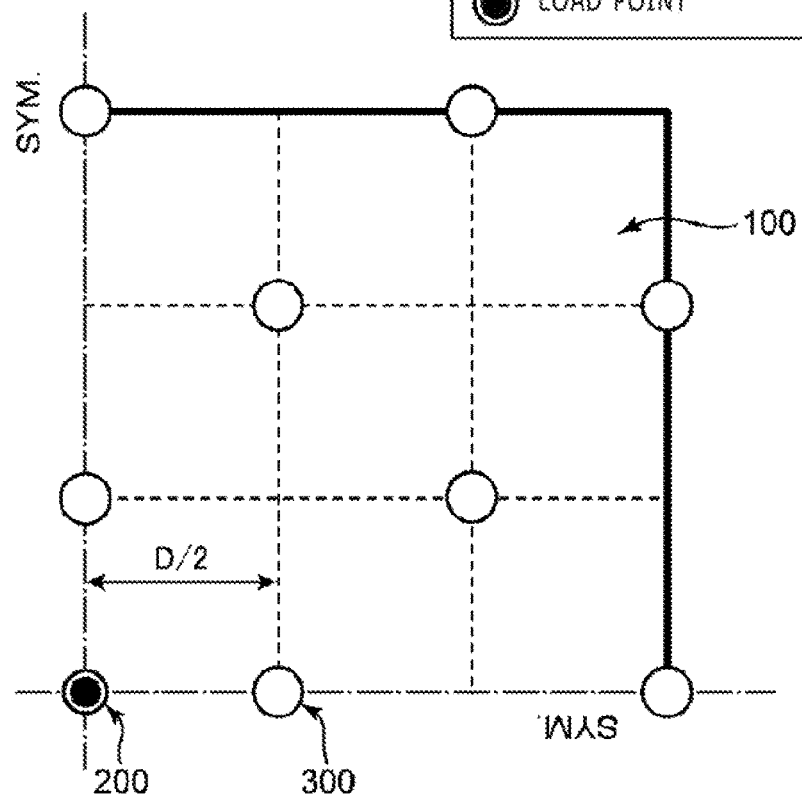
Figures 5, 6:
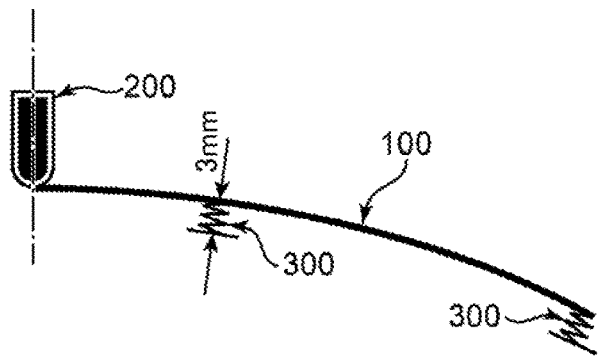
FIG. 5 is a front view of the view of FIG. 4.
FIG. 6 is a table showing evaluation results of tension stiffness.

In this example, a test panel 100 simulating the outer panel 10 of the above-described embodiment and a spring component 300 simulating the adhesive component 30 were used for evaluation using computer aided engineering (CAE) analysis. As illustrated in FIGS. 4 and 5, the test panel 100 is produced by modeling part of the outer panel 10 with a ¼ symmetric condition, and has a shape bent to have a predetermined curvature radius. The spring component 300 is disposed between the back of the test panel 100 and a rigid body provided at a position 3 mm away from the back, and has a spring constant of 70 kN/mm. The spring constant of the adhesive component 30 has been found to have no influence on the tension stiffness of the outer panel 10.

The tension stiffness was evaluated with CAE analysis based on a displacement amount S of the middle of the test panel 100 when a load P was applied to the middle of the test panel 100 by a tool 200 having a spherical head 12 mm in diameter. The load P is 98 N. This analysis was performed for each of adhesive-component intervals D illustrated in FIG. 4 of 100 mm, 150 mm, and 200 mm.

Figure 7:
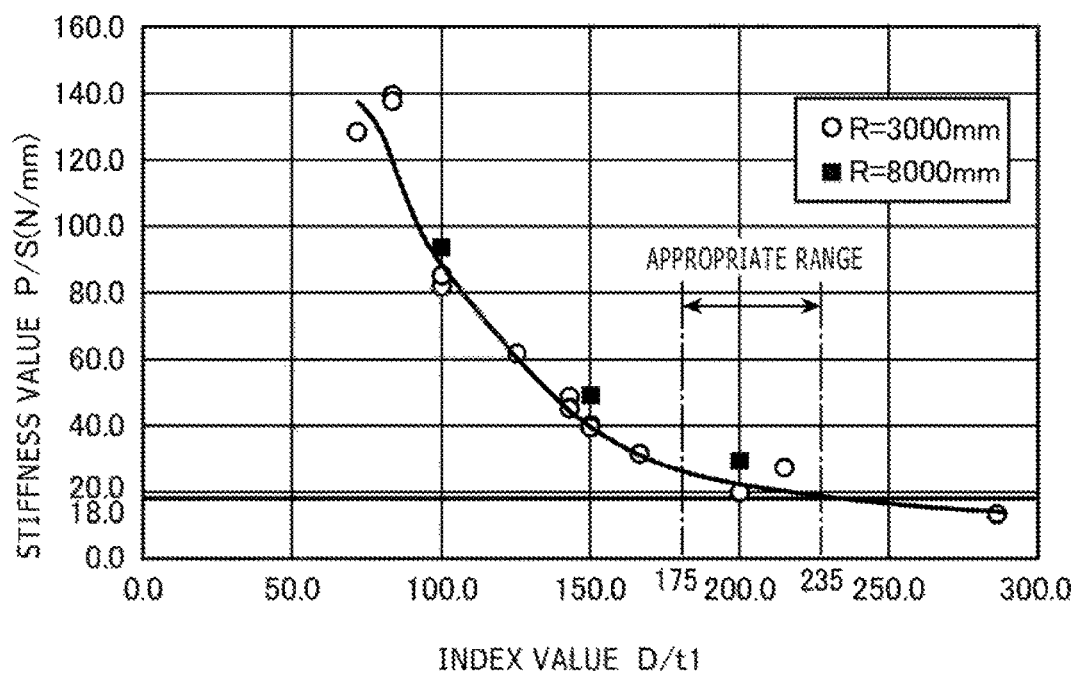
FIG. 7 is a graph showing a relationship between an index value D/t1 and a stiffness value P/S.
Figure 8:
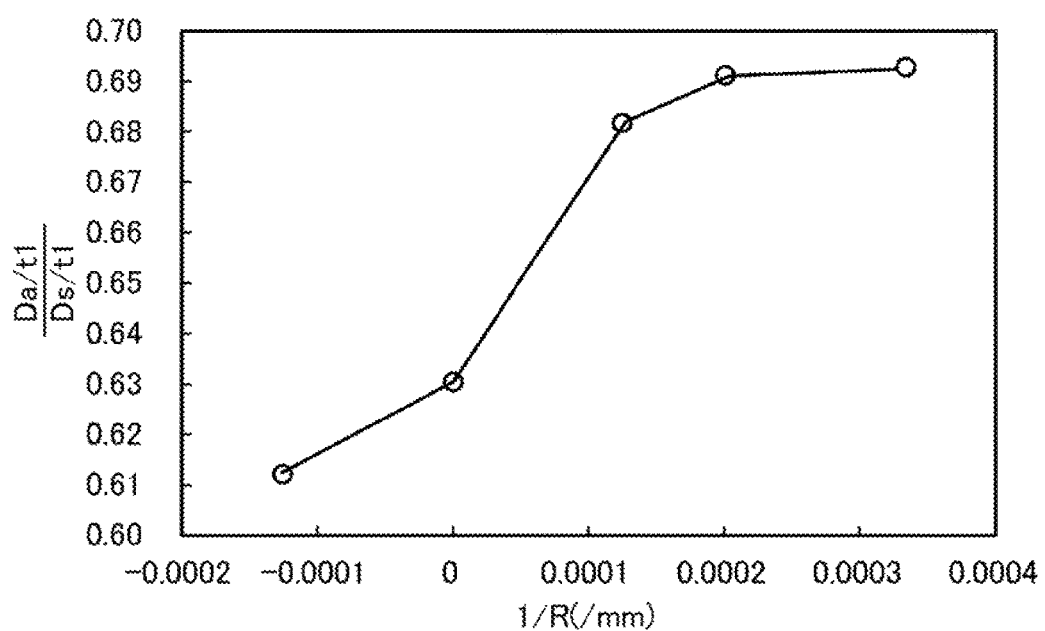
FIG. 8 illustrates a relationship between a curvature of the outer panel and a ratio of an aluminum index value Da/t1 to a steel sheet index value Ds/t1.

FIG. 8 shows such evaluation results. FIG. 7 shows a relationship between the index value D/t1 and a stiffness value P/S (a value obtained by dividing the load P by the displacement amount S of the test panel 100 when the load P is applied to the test panel 100). From the results of such evaluation and analysis, the inventors have found that the stiffness value P/S of the panel component is determined substantially unambiguously for the index value D/t1. The stiffness value P/S is desirably 18 to 30 N/mm, and more desirably 18 N/mm. FIG. 7 reveals that the index value D/t1 is 175 to 235 for the stiffness value P/S of 18 to 30 N/mm, and is 200 for the stiffness value P/S of 18 N/mm or more.

FIG. 8 is a graph illustrating a relationship between a curvature of the outer panel 10 and a ratio of the index value D/t1 of an outer panel made of aluminum alloy (hereinafter, represented as "aluminum index value Da/t1") to the index value D/t1 of an outer panel made of a steel sheet (hereinafter, represented as "steel sheet index value Ds/t1"). The target value of the steel sheet index value Ds/t1 is 285 to 335. FIG. 8 reveals that the aluminum index value Da/t1 equivalent to the steel sheet index value Ds/t1 somewhat varies depending on the curvature of the outer panel, and is about 0.6 to 0.7 times the steel sheet index value Ds/t1. Specifically, since the target value of the steel sheet index value Ds/t1 is 285 to 335, a preferred range of the aluminum index value Da/t1 is about 175 to 235. In other words, the aluminum index value Da/t1 is set to 175 to 235, thereby the stiffness value P/S is 18 to 30 N/mm, thus allowing an outer panel made of aluminum or aluminum alloy to have tension stiffness equivalent to that of an outer panel made of a steel sheet.

This application claims priority to Japanese Patent Application No. 2016-070579, filed Mar. 31, 2016 and Japanese Patent Application No. 2016-163477, filed Aug. 24, 2016, the entirety of which is hereby incorporated by reference.

What is claimed is:

1. A vehicle hood comprising:
an outer panel;
an inner panel disposed below the outer panel; and
a plurality of adhesive components connecting the outer panel to the inner panel,
wherein:
the inner panel has a plurality of beads, the beads each having a shape extending along a specific direction and being disposed so as to be intermittently aligned along an intersecting direction intersecting with the specific direction;
each of the beads has a support part that has a shape extending along the specific direction and supports each of the adhesive components at a position opposed to the outer panel;
the adhesive components are provided on the support parts so as to be intermittently aligned along the specific direction; and
a support-part interval between the support parts adjacent to each other in the intersecting direction is smaller than an adhesive-component interval between the adhesive components adjacent to each other on each of the support parts.

2. The vehicle hood according to claim 1,
wherein adhesive components disposed on a specific support part among the support parts and adhesive components disposed on a support part adjacent to the specific support part in the intersecting direction are disposed in a zigzag pattern.

3. The vehicle hood according to claim 1,
wherein:
the outer panel is made of aluminum or aluminum alloy;
the outer panel has a middle adhesive region between a portion located on a foremost bead located in a foremost among the beads and a portion located on a rearmost bead located most rearward among the beads in a vehicle front-hack direction; and
an index value 175 to 235, the index value being represented by a ratio of the adhesive-component interval to a thickness of the outer panel in the middle adhesive region.

4. The vehicle hood according to claim 3,
wherein:
the inner panel further has a front support part that supports an adhesive component at a position opposed to the outer panel between the foremost bead and a front end of the inner panel;
the outer panel has a front adhesive region between the portion located on the foremost bead and a front end of the outer panel in the vehicle front-back direction; and
an index value is 80 to 100, the index value being represented by a ratio of a front adhesive-component interval between the adhesive components in a vehicle width direction in the front adhesive region to the thickness of the outer panel.

5. The vehicle hood according to claim 1,
wherein:
an edge of the outer panel configures a folded grip part that grips an edge of the inner panel from two sides in a thickness direction of the inner panel while being folded inward; and
a thickness of the inner panel is at least 0.8 times a thickness of the outer panel.

6. The vehicle hood according to claim 5,
wherein the thickness of the inner panel is not more than 1.1 times the thickness of the outer panel.

* * * * *